(12) United States Patent
Gass et al.

(10) Patent No.: US 9,264,549 B1
(45) Date of Patent: Feb. 16, 2016

(54) SHORT MESSAGING SERVICE, APPARATUS, METHOD, AND COMPUTER PROGRAM

(75) Inventors: Steven E. Gass, Omaha, NE (US); Jeffrey William Cordell, Omaha, NE (US); James K. Boutcher, Omaha, NE (US); Myron P. Sojka, Logan, IA (US)

(73) Assignee: West Corporation, Omaha, NE (US)

( * ) Notice: Subject to any disclaimer, the term of this patent is extended or adjusted under 35 U.S.C. 154(b) by 214 days.

(21) Appl. No.: 13/353,822

(22) Filed: Jan. 19, 2012

(51) Int. Cl.
*H04M 3/42* (2006.01)
*H04M 3/56* (2006.01)
*H04W 64/00* (2009.01)
*H04M 1/725* (2006.01)
*H04W 4/12* (2009.01)

(52) U.S. Cl.
CPC .......... *H04M 3/565* (2013.01); *H04M 1/72566* (2013.01); *H04W 4/12* (2013.01); *H04W 64/00* (2013.01)

(58) Field of Classification Search
CPC ..................... H04M 1/72566; H04M 1/72572; H04M 3/56; H04M 2203/2072; H04M 2242/30; H04M 1/72552; H04M 3/565; H04W 4/02; H04W 64/00; H04W 4/021; H04W 4/023; H04W 4/043; H04W 4/08; H04W 4/12; H04W 4/14; H04L 12/1818; H04L 12/189; H04L 12/1813; G01S 5/0027
USPC ................ 455/414.1, 416, 456.1–456.6, 415, 455/412.1, 412.2; 370/259–264; 379/202.1, 379/203.1, 204.1, 205.1, 202.01, 203.01, 379/204.01, 205.01; 709/204, 206, 207, 709/219, 227
See application file for complete search history.

(56) References Cited

U.S. PATENT DOCUMENTS

| | | | |
|---|---|---|---|
| 7,277,697 B2 * | 10/2007 | Desai et al. ................... | 455/416 |
| 7,328,029 B1 * | 2/2008 | Adamczyk et al. ......... | 455/456.3 |
| 7,398,295 B2 * | 7/2008 | Shoroff et al. ................ | 709/204 |
| 8,260,321 B1 * | 9/2012 | Dunko ........................ | 455/456.3 |
| 8,494,141 B2 * | 7/2013 | Jenkins et al. ........... | 379/202.01 |
| 8,626,847 B2 * | 1/2014 | Jones et al. .................... | 709/206 |
| 2007/0288291 A1 * | 12/2007 | Earle ................................. | 705/9 |
| 2009/0179983 A1 * | 7/2009 | Schindler ................... | 348/14.08 |
| 2010/0246448 A1 * | 9/2010 | Krantz et al. ................. | 370/260 |
| 2011/0270936 A1 * | 11/2011 | Guthrie et al. ................ | 709/206 |
| 2012/0246229 A1 * | 9/2012 | Carr et al. ..................... | 709/204 |

* cited by examiner

Primary Examiner — Olumide T Ajibade Akonai

(57) ABSTRACT

An apparatus, method, and/or computer program is provided to detect, based on a predetermined period of time, that one or more conference participants are located in a conference room. An alert message is transmitted to a registered mobile device of the leader of the conference. The alert message indicates that one or more conference participants are waiting in the conference room. And, the conference leader is connected to the conference room based on a response message received from the conference leader.

20 Claims, 3 Drawing Sheets

SHORT MESSAGING SERVICE, APPARATUS, METHOD, AND COMPUTER PROGRAM

FIELD

The present invention relates to a Short Messaging Service (SMS) application and, more particularly, to an SMS application that informs an organizer or leader of a conference that attendees are waiting in the conference.

BACKGROUND

Generally, before a telephone conference call takes place between two or more individuals, one of the individuals, usually the conference organizer or leader, sets up a conference call utilizing a conference call management tool. The conference call can be setup for a specific date and time and a notification can be sent to all participants of the date and time, as well as the call-in number and pass code. On the date and time of the conference call, participants can join the conference call utilizing the call-in number and the pass code. However, there may be instances where the leader of the conference call has failed to join in or has failed to inform the participants that the conference call is cancelled. This may result in a delay in starting the conference call and/or unnecessarily cause the participants to join a call that has been cancelled.

SUMMARY

Certain embodiments of the present invention may provide solutions to the problems and needs in the art that have not yet been fully identified, appreciated, or solved by current SMS applications that notify the conference leader that participants are waiting for him/her to join in on a conference call.

In accordance with an embodiment of the present invention, a computer-implemented method is provided. The method includes detecting, based on a predetermined period of time, that one or more conference participants are located in a conference room and transmitting an alert message to a registered mobile device of the leader of the conference. The alert message indicates that one or more conference participants are waiting in the conference room. The method also includes connecting the conference leader to the conference room based on a response message received from the conference leader.

In accordance with another embodiment of the present invention, an apparatus is provided. The apparatus includes a conference manager unit configured to detect, based on a predetermined period of time, that one or more conference participants are located in a conference room. A notifications management unit is configured to transmit an alert message to a registered mobile device of the leader of the conference. The alert message indicates that one or more conference participants are waiting in the conference room. The conference manager unit is configured to connect the conference leader to the conference room based on a response message received from the conference leader.

BRIEF DESCRIPTION OF THE DRAWINGS

For a proper understanding of the invention, reference should be made to the accompanying figures. These figures depict only some embodiments of the invention and are not limiting of the scope of the invention. Regarding the figures.

DETAILED DESCRIPTION OF THE EMBODIMENTS

It will be readily understood that the components of the invention, as generally described and illustrated in the figures herein, may be arranged and designed in a wide variety of different configurations. Thus, the following detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One or more embodiments described herein relate to an apparatus, method, and/or computer program that notifies a conference leader that he/she needs to join in on a conference call when the participants have been waiting in the conference call for a predetermined period of time. The apparatus, method, and/or computer program allows the conference leader to respond that he/she is or is not joining the conference. In the event that the leader is joining the conference, then the apparatus, method and/or computer program connects the leader to the conference. If he/she is not joining, then the participants are notified accordingly and dropped from the conference call.

Figure 1:
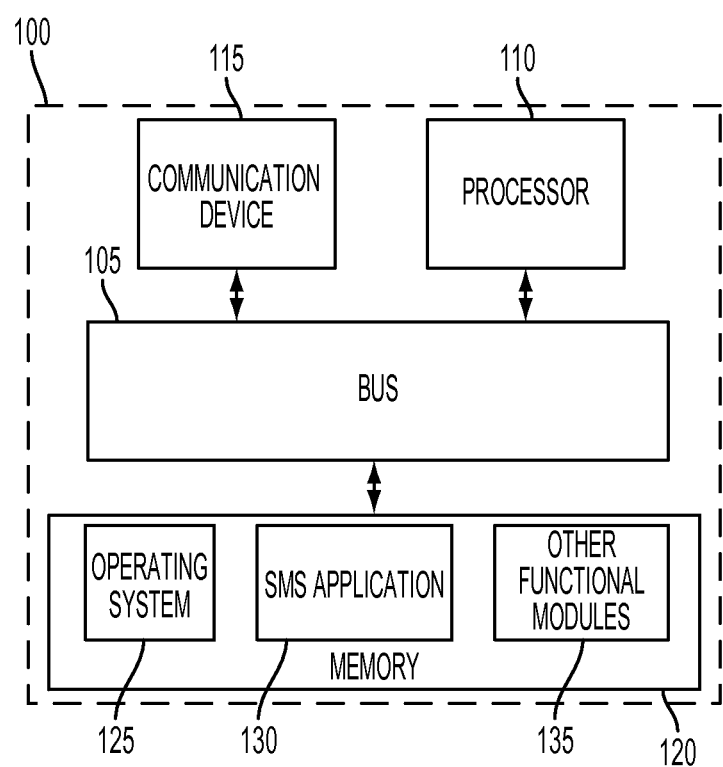
FIG. 1 illustrates a block diagram of a system, in accordance with an embodiment of the present invention.

FIG. 1 illustrates a block diagram of a system 100, in accordance with an embodiment of the present invention. System 100 may include a bus 105 or other communication mechanism that can communicate information and a processor 110, coupled to bus 105, that can process information. Processor 110 can be any type of general or specific purpose processor. System 100 may also include a memory 120 that can store information and instructions to be executed by processor 110. Memory 120 can be comprised of any combination of random access memory ("RAM"), read only memory ("ROM"), static storage such as a magnetic or optical disk, or any other type of computer readable medium. System 100 may also include a communication device 115, such as a network interface card, that may provide access to a network.

The computer readable medium may be any available media that can be accessed by processor 110. The computer readable medium may include both volatile and nonvolatile medium, removable and non-removable media, and communication media. The communication media may include computer readable instructions, data structures, program modules, or other data and may include any information delivery media.

According to one embodiment, memory 120 may store software modules that may provide functionality when executed by processor 110. The modules can include an operating system 125 and an SMS application 130, as well as other functional modules 135. Operating system 125 may provide operating system functionality for system 100. Because system 100 may be part of a larger system, system 100 may include one or more additional functional modules 135 to include the additional functionality.

Figure 2:
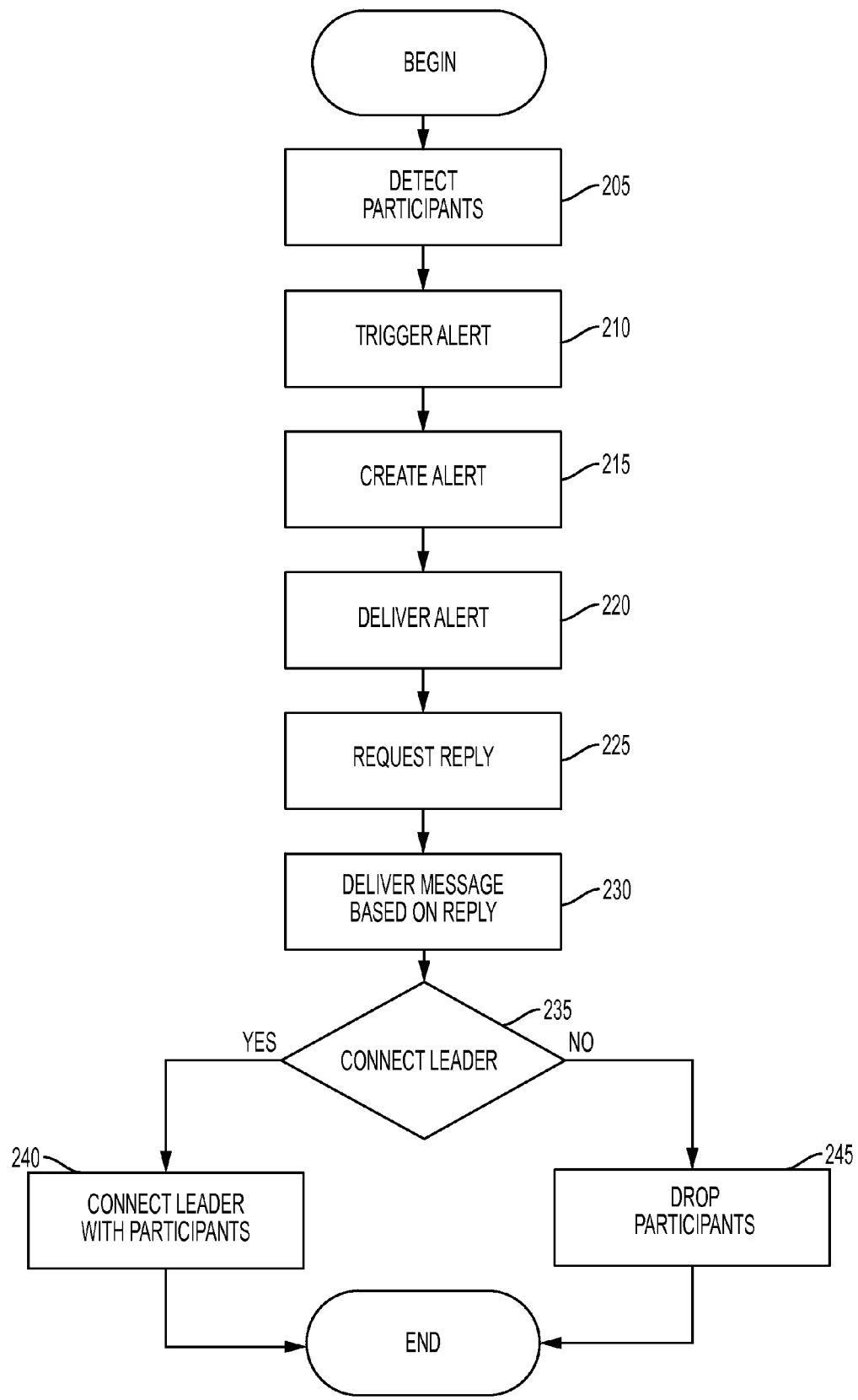
FIG. 2 illustrates a method for informing a leader that participants are waiting in a conference room, in accordance with another embodiment of the present invention.

FIG. 2 illustrates a method 200 for informing a leader that participants are waiting in a conference room, in accordance with another embodiment of the present invention. At 205, a conference manager detects one or more participants waiting in a lobby for a predefined period of time. The predefined period of time can be configured by a conference manager, leader or organizer of the conference. The predefined period of time can also be any predefined period of time that can be appreciated by a person of ordinary skill in the art.

At 210, the conference manager triggers an alert to a notifications management system. At 215, an alert is created by the system for the leader of the conference. The alert can notify the leader that participants are present in the lobby and are waiting for the leader to join the conference. At 220, the system utilizes a multi-channel notification delivery in order to deliver, via SMS or a mobile application, the alert to a registered mobile device of the leader. It should be appreciated that the alert can also be sent to any other device (i.e., a personal computer, notebook, iPad®, etc.) of the leader.

At 225, the SMS requests the leader to respond by selecting to "join the conference," or cancel the meeting by indicating that there is "no meeting today," or any other message that would be appreciated by a person of ordinary skill in the art. At 230, the conference manager receives a response from the leader and delivers the appropriate message to the conference bridge. At 235, the conference manager determines, based on the response received from the leader, whether to connect the leader to the conference room or to cancel the conference. At 240, if the leader wants to join the conference, then the conference manager transmits a dial-out number in order for the leader of the conference to join the conference room. At 245, if the leader does not want to join the conference room, the conference manager informs the participants of the conference and cancels the conference accordingly.

Figure 3:
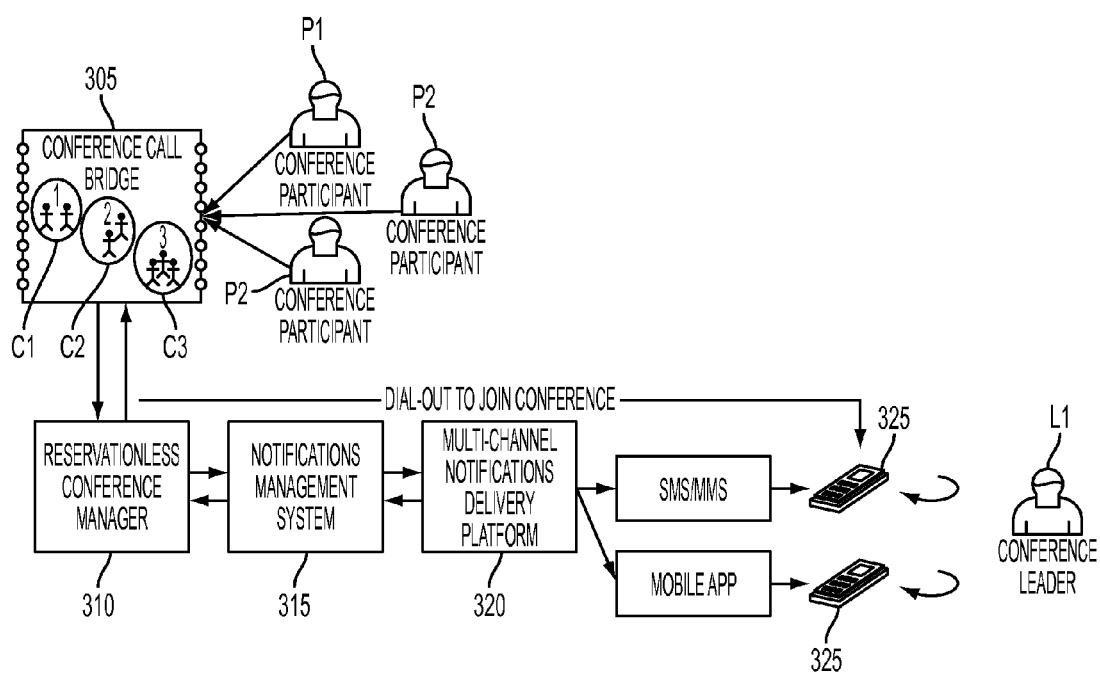
FIG. 3 illustrates a system configured to notify a leader that participants are waiting in a conference room, in accordance with one or more embodiments of the present invention.

FIG. 3 illustrates a system 300 configured to notify a leader that participants are waiting in a conference room, in accordance with one or more embodiments of the present invention. System 300 includes a conference call bridge 305, a reservationless conference manager (or unit) 310, a notifications management system (or unit) 315, and a multi-channel notifications delivery platform 320. It should be appreciated that reservationless conference manager 310 and notifications management system 315 may be separate units or components, but may operate on a service layer. In an alternative embodiment, reservationless conference manager 310 and notifications management system 315 may be the same unit or component.

Conference call bridge 305 can include a plurality of conferences. Each conference includes at least one participant and one conference organizer (or leader). A conference can be established (or setup) when a first user (e.g., participant or leader) calls into the bridge and validates the appropriate credentials. An application, which may be software or a combination of software and hardware, allows conference call bridge 305 to then open a conference room and place the first user in the conference.

In this embodiment, FIG. 3 shows that conference call bridge 305 includes three active conferences C1, C2, C3. However, it should be appreciated that one or more active conferences may be conducted in conference call bridge 305 at any given time. With respect to conference C3, there are three conference participants P1, P2, P3 waiting for a conference leader L1 to join.

Conference manager 310 is configured to detect that one or more participants are waiting in a conference room for a predefined period of time. A conference room leader, conference manager 310, or anyone that would be appreciated by a person of ordinary skill in the art can define the period of time. A timer can start when a participant joins a conference without the leader joining. This function may be configurable through an InterCall Online function to define a "wait period" as some leaders may be late to start a meeting. To avoid starting the conference before the leader arrives, conference manager 310 may also transmit a request message to conference room leader asking to start the conference or delay the conference after the one or more participants have been waiting in the conference room for the period of time. Conference manager 310 can take the appropriate action of starting or delaying the conference based on the conference leader's reply. A more detailed explanation of notifying the conference leader is provided below.

Based on the detection, conference manager 310 can be further configured to trigger an alert to notifications management system 315 that participants are waiting in the conference room for the leader to join. In this embodiment, conference manager 310 detects that participants P1, P2, P3 have been waiting in conference room C3 for a period of time, and triggers an alert to notifications management system 315 that leader L1 has not joined conference room C3.

Notifications management system 315 is configured to create an alert message to notify a conference leader that one or more participants have been waiting in the conference room for a predefined period of time. The alert is created based on the registered leader's mobile device, or any registered device of the leader that would be appreciated by a person of ordinary skill in the art. For example, notifications management system creates an alert to notify conference leader L1 that participants P1, P2, P3 have been waiting in conference room C3 for a predefined period of time.

Multi-channel notifications delivery platform 320 is configured to transmit the alert via SMS or a mobile application to registered mobile device 325 of the conference leader. For example, Multi-channel notifications delivery platform 320 transmits an SMS to registered mobile device 325 of conference leader L1 in order to notify that participants P1, P2, P3 are waiting in conference room C3 for a predefined period of time.

The SMS or the mobile application message is configured to request the conference leader, in this example conference leader L1, to reply to the request. The reply can indicate whether the leader wants to join the conference or close the conference room. Conference manager 310 receives the reply and, based on the reply, transmits a message indicating that the conference leader is joining the conference room or closing the conference room. The conference room can be closed for any reason, which may be stated in the message transmitted by conference manager 310. If the conference leader wants to join the conference, then conference manager 310 can transmit a dial-out number to the leader in order to join the conference. If the conference leader does not want to join, then conference manager 310 can inform the participants and close the conference accordingly.

The method steps shown in FIG. 2 may be performed, in part, by a computer program product, encoding instructions for a nonlinear adaptive processor to cause at least the method steps described in FIG. 2 to be performed by the apparatuses discussed herein. The computer program product may be embodied on a non-transitory computer readable medium. The computer readable medium may be, but is not limited to, a hard disk drive, a flash device, a random access memory, a tape, or any other such medium used to store data. The computer program product may include encoded instructions for controlling the nonlinear adaptive processor to implement the method described in FIG. 2, which may also be stored on the computer readable medium.

The computer program product can be implemented in hardware, software, or a hybrid implementation. The computer program product can be composed of modules that are in operative communication with one another, and which are designed to pass information or instructions to display. The computer program product can be configured to operate on a general purpose computer, or an application specific integrated circuit ("ASIC").

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
   detecting that one or more conference participants are located in a conference room for a determined period of time;
   transmitting an alert message to a registered mobile device of the leader of the conference, the alert message indicating that one or more conference participants are waiting in the conference room; and
   connecting the conference leader to the conference room based on a response message received from the conference leader.

2. The computer-implemented method of claim 1, wherein the predetermined period of time is defined by a conference manager or a conference leader.

3. The computer-implemented method of claim 1, wherein the alert message requests the response message from the conference room leader.

4. The computer-implemented method of claim 1, further comprising:
   triggering a notifications management unit to create the alert message to notify the conference leader that one or more participants are waiting in the conference room.

5. The computer-implemented method of claim 4, further comprising: transmitting the alert message to the registered mobile device of the conference leader by utilizing a multi-channel delivery platform.

6. The computer-implemented method of claim 1, wherein the alert message is transmitted via a short messaging service or a mobile application.

7. The computer-implemented method of claim 1, further comprising:
   receiving, at a conference manager, the response message from the registered mobile device of the conference leader.

8. The computer-implemented method of claim 1, wherein the response message indicates joining the conference room or cancelling the conference room.

9. The computer-implemented method of claim 1, further comprising:
   transmitting, based on the response message from the conference leader, a notification that the conference leader is joining the conference; and
   transmitting a dial-out message to the mobile device of the conference leader in order for the conference leader to connect to the conference.

10. The computer-implemented method of claim 1, further comprising:
    transmitting, based on the response message from the conference leader, a notification that the conference leader is not joining the conference and cancelling the conference.

11. An apparatus, comprising:
    a conference manager unit configured to detect that one or more conference participants are located in a conference room for a predetermined period of time; and
    a notifications management unit configured to transmit an alert message to a registered mobile device of the leader of the conference, the alert message indicating that one or more conference participants are waiting in the conference room,
    wherein the conference manager unit is configured to connect the conference leader to the conference room based on a response message received from the conference leader.

12. The apparatus of claim 11, wherein the predetermined period of time is defined by the conference manager unit or a conference leader.

13. The apparatus of claim 11, wherein the alert message requests the response message from the conference room leader.

14. The apparatus of claim 11, wherein the conference manager unit is further configured to trigger the notifications management unit to create the alert message to notify the conference leader that one or more participants are waiting in the conference room.

15. The apparatus of claim 14, wherein the notifications management unit is configured to transmit the alert message to the registered mobile device of the conference leader by utilizing a multi-channel delivery platform.

16. The apparatus of claim 11, wherein the alert message is transmitted via a short messaging service or a mobile application.

17. The apparatus of claim 11, wherein the conference manager unit is further configured to receive the response message from the registered mobile device of the conference leader.

18. The apparatus of claim 11, wherein the response message indicates joining the conference room or cancelling the conference room.

19. The apparatus of claim 11, wherein the conference manager unit is further configured to
    transmit, based on the response message from the conference leader, a notification that the conference leader is joining the conference, and
    transmit a dial-out message to the mobile device of the conference leader in order for the conference leader to connect to the conference.

20. The apparatus of claim 11, wherein the conference manager unit is further configured to transmit, based on the response message from the conference leader, a notification that the conference leader is not joining the conference and cancel the conference.

* * * * *